United States Patent [19]

Akatsu

[11] 4,115,812
[45] Sep. 19, 1978

[54] AUTOMATIC GAIN CONTROL CIRCUIT

[75] Inventor: Mitsuharu Akatsu, Yokohama, Japan

[73] Assignee: Hitachi, Ltd., Japan

[21] Appl. No.: 824,783

[22] Filed: Aug. 15, 1977

Related U.S. Application Data

[63] Continuation of Ser. No. 526,406, Nov. 22, 1974, abandoned.

[30] Foreign Application Priority Data

Nov. 26, 1973 [JP] Japan .................. 48-131710

[51] Int. Cl.² ............................................. H04N 5/52
[52] U.S. Cl. ............................................. 358/174
[58] Field of Search .............................. 358/174, 176

[56] References Cited

U.S. PATENT DOCUMENTS

| | | | |
|---|---|---|---|
| 2,241,553 | 5/1941 | Kallman et al. | 358/176 |
| 2,885,472 | 5/1959 | Billin et al. | 358/176 |
| 2,938,950 | 5/1960 | Gent | 358/178 |
| 2,942,063 | 6/1960 | Billin | 358/174 |
| 3,249,695 | 5/1966 | Loughlin et al. | 358/178 |

FOREIGN PATENT DOCUMENTS

| | | |
|---|---|---|
| 1,209,666 | 3/1960 | France. |
| 653,788 | 5/1951 | United Kingdom. |
| 762,685 | 12/1956 | United Kingdom. |
| 775,673 | 5/1957 | United Kingdom. |
| 1,167,534 | 10/1969 | United Kingdom. |

*Primary Examiner*—Richard Murray
*Attorney, Agent, or Firm*—Craig & Antonelli

[57] ABSTRACT

A signal having a maximum amplitude corresponding to a pedestal level of a composite video signal is produced by removing a horizontal synchronizing signal from the composite video signal. An automatic gain control signal is derived from the first mentioned signal in dependence of the peak value thereof to control a high frequency amplifier and or an intermediate frequency amplifier so that the pedestal portion at the maximum amplitude level of the composite video signal is maintained constant. In this way, a stabilized pedestal portion or the black level can be attained, which in turn results in a stabilized contrast.

11 Claims, 6 Drawing Figures

AUTOMATIC GAIN CONTROL CIRCUIT

This is a continuation of application Ser. No. 526,406, filed Nov. 22, 1974, now abandoned.

The present invention relates to an automatic gain control circuit (hereinafter simply referred to as AGC circuit) for television receivers which allows generation of an automatic gain control signal in dependence of magnitude or level of pedestal portion of a composite video signal.

In the hitherto known AGC circuit of a peak value type or of a keyed type employed in television receivers, the output voltage from the AGC circuit corresponding to the peak value of a horizontal synchronizing signal component which has the greatest amplitude in the television signal is utilized to control gains of a high frequency amplifier or of a video-intermediate frequency amplifier so as to maintain the peak value of the horizontal synchronizing signal at a constant level. However, because the magnitude or amplitude of the horizontal synchronizing signal is unstable even at the time of transmitting the television signal, the control of the gains of the high frequency amplifier or the video-intermediate frequency amplifier by the AGC circuit so as to make the peak value of the horizontal synchronizing signal constant at the receiving state will bring about variations in the video signal in dependence upon the magnitude of the horizontal synchronizing signal, which in turn provides a serious difficulty in obtaining a suitable contrast. Further, since the ratio of the peak value of the horizontal synchronizing signal to the pedestal level is not constant, the regeneration of a D.C. component by charging a capacitor with the peak voltage of the horizontal synchronizing signal will not result in a constant pedestal level, which thus makes it impossible to attain a correct black level required for an undisturbed image. To dispose of the latter disadvantage, there are known television receivers which are provided with a special D.C. component regenerating circuit operative in response to variations in the pedestal level of the video signal. In the AGC circuit of the keyed type, it is also known that fly-back pulses are utilized as keyer pulses for extracting or keying the horizontal synchronizing signal. Accordingly the AGC circuit of this type can not operate normally in the absence of the horizontal synchronization. Further, there may arise a danger that the use of fly-back pulse as the keyer pulse should lead to the destruction of the AGC circuit due to the pulse voltage generated at the time when the cathode ray tube is discharged.

An object of the present invention is therefore to provide an AGC circuit in which the level or magnitude of the pedestal portion does not undergo any variation under the influence of the horizontal synchronizing signal with out resorting to the provision of the specific D.C. component regenerating circuit and the use of the fly-back pulses.

To accomplish the above object the present invention proposes to produce a signal having the maximum amplitude corresponding to the level of the pedestal portion of the composite video signal and derive an AGC voltage from the above signal, which voltage is fed to the stage preceeding the AGC circuit to maintain the peak value of the pedestal portion.

The above and other objects and novel features as well as advantages of the invention will become more apparent from the examination of the following description of the preferred embodiments of the invention made with reference to the drawings, in which.

Figure 1:
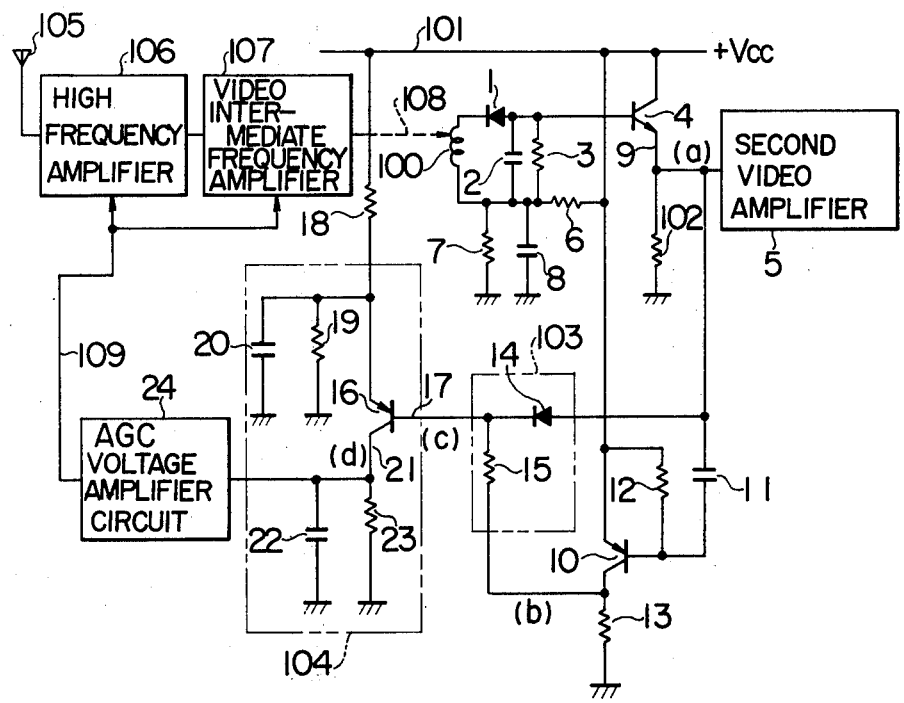
FIG. 1 is a circuit diagram of an examplary embodiment of the AGC circuit according to the invention.

Referring to FIG. 1 which shows an automatic gain control or AGC circuit according to the invention, the circuit comprises a coil 100 having one end grounded to earth through a parallel connection of a resistor 7 and a capacitor 8 and further connected to a supply line 101 for D.C. voltage +Vcc, while the other end of the coil 100 is connected to the base of a transistor 4 constituting a first video amplifier through a diode 1. The junction between the diode 1 and the base of the transistor 4 is connected to the above mentioned one end of the coil 100 through a capacitor 2 and a resistor 3 connected in parallel with each other. The transistor 4 has collector connected to the line 101 and an emitter electrode 9 which is grounded through a resistor 102 and at the same time connected to a second video amplifier 5. The emitter 9 of the transistor 4 is moreover connected to the base of a synchronizing separation transistor 10 by way of a capacitor 11, the emitter of which transistor 10 in turn is connected directly to the line 101 and to the base of the transistor 10 through a resistor 12, while the collector of the transistor 10 is grounded to earth through a resistor 13 and connected to the base 17 of an AGC voltage detector transistor 16 by way of a resistor 15. The transistor 16 has a base electrode 17 which is connected to the emitter 9 of the transistor 4 through a switching diode 14 and emitter which is connected to the line 101 through a resistor 18 and grounded by way of a parallel connection of a resistor 19 and a capacitor 20. The collector 21 of the transistor 16 is grounded to earth through a resistor 23 and a capacitor 22 connected in parallel and besides directly coupled to an AGC voltage amplifier circuit 24.

Figure 2:
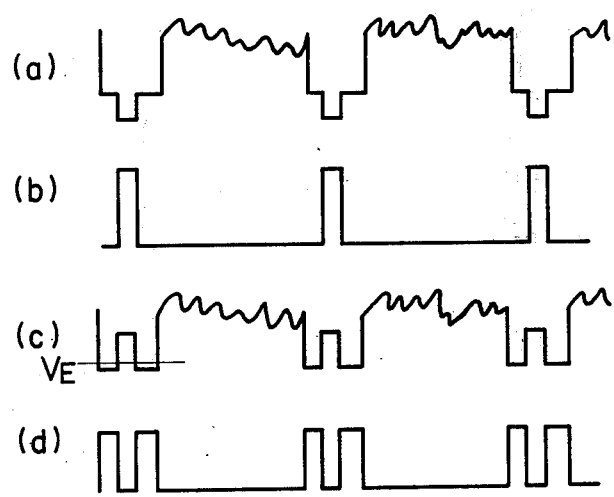
FIG. 2 is a signal wave diagram for illustrating the operations of main portions of the circuit shown in FIG. 1.

The coil 100 is fed with a television signal 108 which has been received by an antenna 105 and passed through a high frequency amplifier 106 and a video intermediate frequency amplifier 107. This television signal 108 which contains a negatively modulated composite video signal having a horizontal synchronizing signal and a pedestal level is detected by a detector circuit composed of the diode 1, capacitor 2, resistor 3 and capacitor 8 to produce the composite video signal, which is then supplied to the video amplifier consisting of the transistor 4 and the second video amplifier 5. The composite video signal will thus appear at the emitter 9 of the transistor 4 in a voltage wave form shown in FIG. 2(a). The horizontal synchronizing signal generator composed of the resistors 6, 7, 12 and 13, the transistor 10 and the capacitor 11 is supplied with the composite video signal shown in FIG. 2(a), whereby a horizontal synchronizing signal shown in FIG. 2(b) is obtained at the collector electrode of the transistor 10. These circuits are well known ones which constitute parts of a television receiver.

The diode 14 and the resistor 15 constitutes a switch circuit 103, while the resistors 18, 19 and 23, the capacitor 20 and 22 and the transistor 16 constitutes the AGC signal detector circuit 104. The switch circuit 103 constitutes and AGC signal generator together with the AGC signal detector circuit 104.

In the following, the operation of the AGC circuit shown in FIG. 1 will be described.

During the rest interval of the horizontal synchronizing signal, the diode 14 is tuned on by the current flowing through the resistors 13 and 15, whereby the output from the emitter 9 of the transistor 4 is applied to the base 17 of the AGC voltage detection transistor 16 through the diode 4. On the other hand, during the duration of the horizontal synchronizing signal, the transistor 10 becomes conductive and the positive pulse voltage shown in FIG. 2(b) will appear at the base 17 of the transistor 16 for the AGC voltage detector circuit, as a result of which the diode 14 is turned off, whereby no horizontal synchronizing signal will appear at the base 17 of the transistor 16. Consequently, a composite video signal having pedestal portions of the maximum amplitude such as shown in FIG. 2(c) will appear at the base electrode 17 of the transistor 16 for the AGC voltage detector circuit 104. In this connection, the emitter of the AGC voltage detector transistor 16 is applied with a bias voltage through the resistors 18, 19 and the capacitor 20 set at level slightly higher than the voltage level of the pedestal portion of the composite video signal appearing at the base electrode 17 of the AGC voltage detector transistor 16. This bias voltage is represented by $V_E$ in FIG. 2(c). Accordingly, the AGC voltage detector transistor 16 will become conductive at the level of pedestal portions, which results in the generation of a positive pulse voltage shown in FIG. 2(d) at the collector 21 of the transistor 16 in accordance with the level of the pedestal portions. The positive pulse voltage is smoothed by means of the capacitor 22 and the resistor 23 and, after having been amplified by the AGC voltage amplifier circuit 24, is fed to the video intermediate frequency amplifier 107 or the high frequency amplifier 106 as the AGC voltage 109 to control the gains of these amplifiers to thereby maintain the level or magnitude of the pedestal portions at a constant level.

Figure 3:
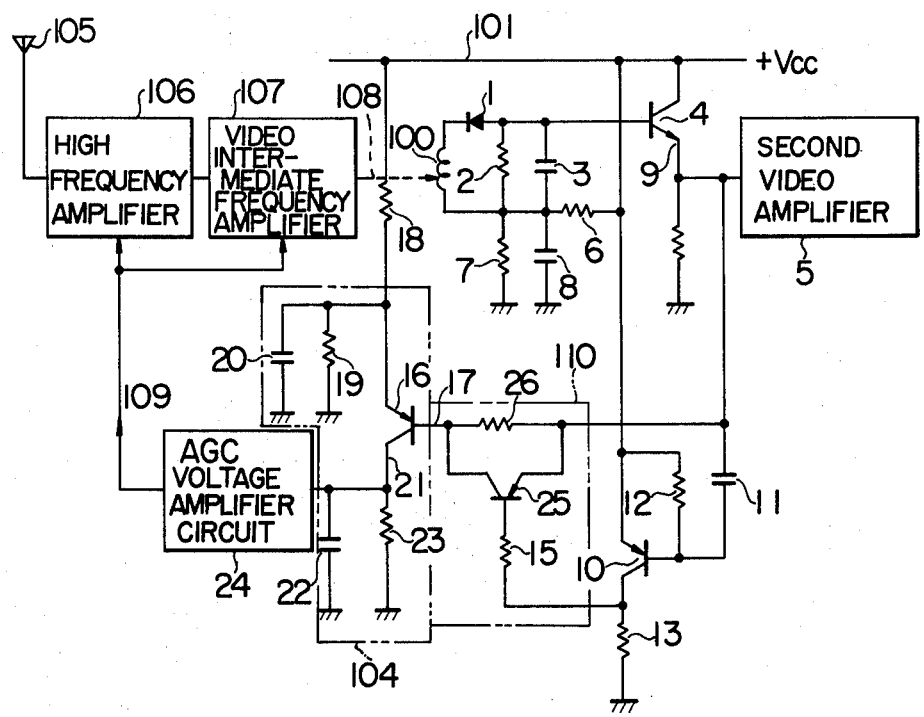
FIG. 3 is a circuit diagram showing a modification of the AGC circuit shown in FIG. 1.

FIG. 3 shows a modification of the AGC circuit shown in FIG. 1, in which the switch circuit 103 composed of the diode 14 and the resistor 15 is replaced by a switch circuit 110 comprising a switching transistor 25, a resistor 26 of a high resistance value and a resistor 15. In FIG. 3, same reference numerals as those in FIG. 1 stand for the same circuit components shown in FIG. 1.

Referring to FIG. 3, during the durations of the horizontal synchronizing signal pulses, the transistor 25 is cut off due to the pulse voltage shown in FIG. 2(b) applied to its base. Further, the resistor 26 is of a great resistance value. Accordingly, the horizontal synchronizing pulses are not applied to the base 17 of the transistor 16. During the rest intervals of the horizontal synchronizing signal pulses, the forward current will flow through the emitter-base junction of the transistor 25 which is thus turned on. Consequently, the base 17 of the transistor 16 is applied with the signal shown in FIG. 2(c). It should be recalled that the transistor 16 is applied at its emitter with a bias voltage to cut off the transistor 16 during the duration of the video signal. Accordingly, the transistor 16 is turned on during the duration of the pedestal portion to produce at its collector 21 the voltage shown in FIG. 2(d) having an amplitude depending on the pedestal level. Since the remaining operation of the AGC circuit shown in FIG. 3 is effected in a similar manner as is in the circuit of FIG. 1, further description will be unnecessary.

Figure 4:
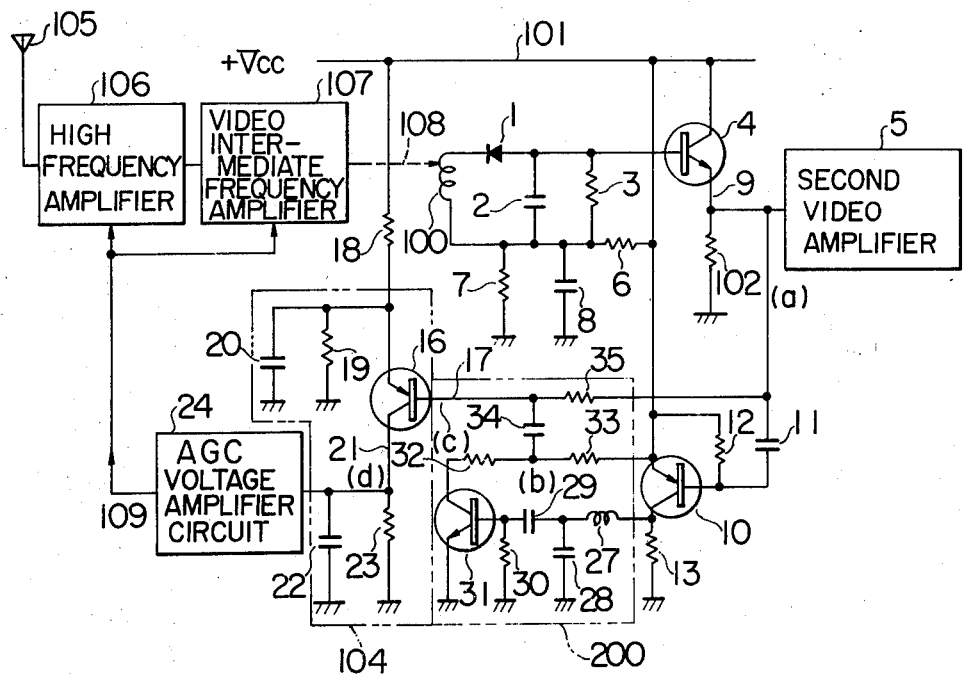
FIG. 4 is a circuit diagram showing another embodiment of the AGC circuit.

FIG. 4 shows another exemplary embodiment of the invention. It should be noted that same reference numerals as those in FIGS. 1 and 3 denote the same circuit or function elements.

In case of the AGC circuit shown in FIG. 4, the horizontal synchronizing signal is not directly cancelled from the composite video signal contrary to the cases of the circuits shown in FIGS. 1 and 3. The circuit of FIG. 4 is so arranged that a signal having a constant magnitude greater than the peak amplitude of the horizontal synchronizing signal as measured from the pedestal level is superposed on the pedestal portion, whereby the maximum value of the superposed signal is employed as the pedestal level to thereby substantially cancel the horizontal synchronizing signal. To achieve this, a circuit 200 composed of a coil 27 and resistors 30, 32, 33 and 35, capacitors 28, 29 and 34 and a transistor 31 is used in place of the switch circuits employed in the afore-mentioned embodiments. One end of the resistor 35 is connected to the base 17 of the transistor 16, while the other end is connected to the emitter 9 of the transistor 4. The resistors 32 and 33 are connected in series between the line 101 and the collector of the transistor 31. The capacitor 34 is connected between the junction of the resistors 32 and 33 and the base 17 of the transistor 16. The transistor 31 has emitter directly grounded and base also grounded through the resistor 30, the latter being further connected to the collector of the transistor 10 by way of the capacitor 29 and the coil 27. The junction of the capacitor 29 and the coil 27 is grounded through the capacitor 28.

Figure 5:
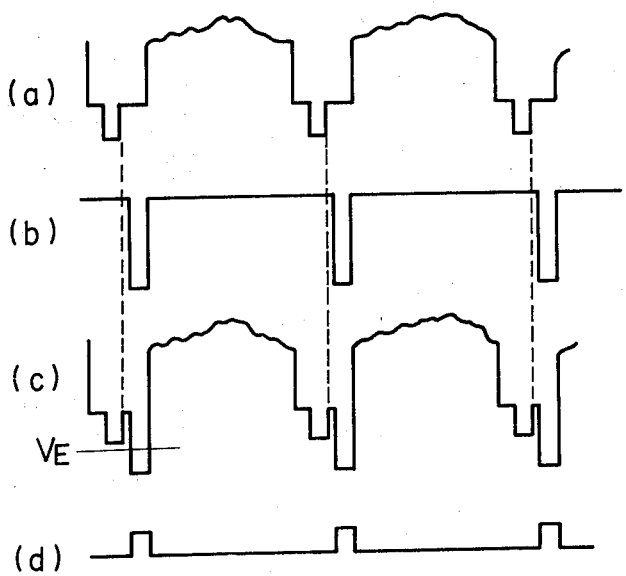
FIG. 5 is a wave diagram of signals available at main portions of the circuit shown in FIG. 4.

In operation of the AGC circuit shown in FIG. 4, the composite video signal of a wave form shown in FIG. 5(a) produced from the emitter 9 of the first video amplifier transistor 4 is supplied to the base 17 of the transistor 16 through the resistor 35 and to the base of the transistor 10 through the capacitor 11 to thereby produce the separated horizontal synchronizing signal at the collector of the transistor 10.

The horizontal synchronizing signal thus separated is then integrated by the coil 27 and the capacitor 28 and clipped at the peak value by the capacitor 29 and the resistor 30. The clipped peak value signal render the transistor 31 conductive and the output of the transistor 31 is subjected to voltage division by the resistors 32 and 33 after having been amplified and inverted by the transistor 31, whereby a pulse voltage having a constant, but considerably larger amplitude, as shown in FIG. 5(b), than that of the horizontal synchronizing signal pulse as measured from the pedestal level is obtained at the junction between the resistors 32 and 33 at a time point delayed slightly from the termination of the horizontal synchronizing signal.

The pulse signal thus derived and shown in FIG. 5(b) is applied to the base 17 of the AGC voltage detector transistor 16 through the capacitor 34 and superposed on the pedestal portion of the composite video signal shown in FIG. 5(a) which is applied also to the base 17 through the resistor 35, which results in a composite video signal of a wave form shown in FIG. 5(c) supplied to the base 17 of the transistor 16. The pulse voltage appearing during the duration of the pedestal portion as shown in FIG. 5(c) is lower not only than the pedestal level by a predetermined value but also than the synchronizing pulse voltage. Consequently, if a bias voltage $V_E$ which is higher than the pulse voltage appearing in the pedestal portion of the video signal and lower than the horizontal synchronizing pulse voltage is applied to the emitter of the transistor 16 for the AGC voltage detector circuit 104 through the resistor 18, a voltage shown in FIG. 5(d) having an amplitude corresponding to the level of the pedestal portion of the composite video signal can be produced at the output of the transistor 16. This voltage (d) serves to control the high frequency amplifier 106 and the video-intermediate frequency amplifer 107 so that the magnitude of the pedestal level of the composite video signal may remain constant.

Figure 6:
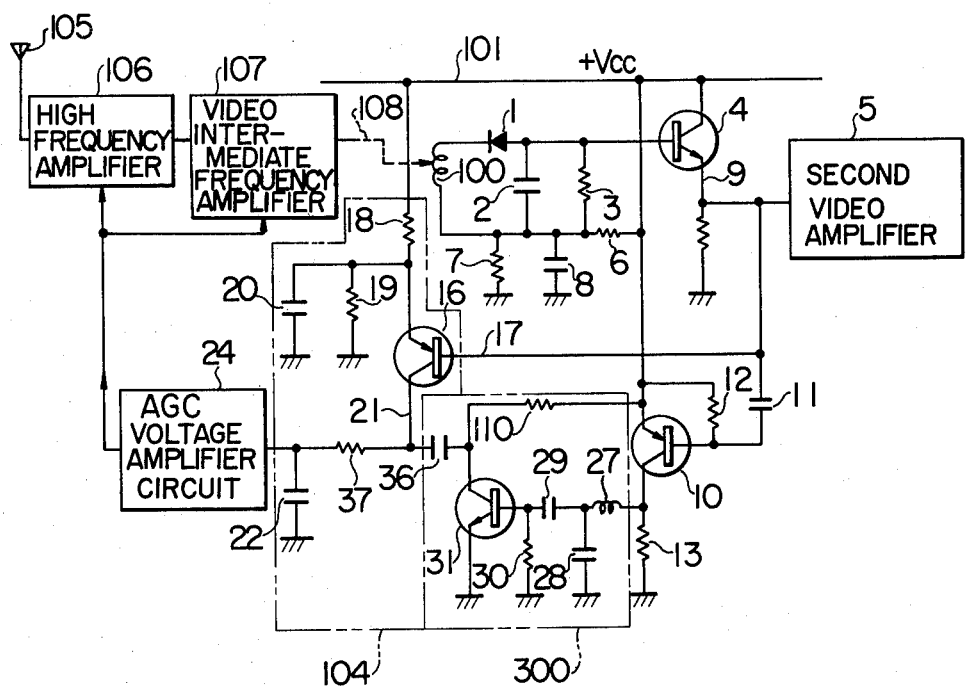
FIG. 6 is a circuit diagram of still another embodiment of the AGC circuit according to the invention.

FIG. 6 shows still another embodiment of the invention. The aforementioned embodiments are similar to an AGC circuit of a peak value type. In contrast, the circuit shown in FIG. 6 is rather akin to the AGC circuit of a keyed type. It should, however, be noted that the circuit shown in FIG. 6 is different from the keyed type AGC circuit in that the fly-back pulse is not used for the keying pulse.

Referring to FIG. 6, a circuit 300 is provided which is composed of coil 27, resistors 30 and 110, capacitors 28, 29 and 36 and a transistor 31. On this embodiment, the resistor 23 of the AGC signal detection circuit 104 is omitted and a resistor 37 is inserted between the junction of the AGC voltage amplifier 24 and capacitor 22 and the collector 21 of the transistor 16. The circuit 300 constitutes an AGC signal generator in cooperation with the AGC signal detection circuit 104 composed of resistors 18, 19 and 23, capacitors 20 and 22 and a transistor 16. The operation of the circuit 300 is similar to that of the circuit 200. The keying pulse for keying or extracting the pedestal portion is derived from the collector of the transistor 31 and supplied to the collector 21 of the transistor 16 through the capacitor 36.

The input signal to the base 17 of the AGC voltage detector transistor 16 is the composite video signal such as shown in FIG. 2(a) or FIG. 5(a). Supplied to the collector 21 of the AGC detector transistor through the capacitor 36 is a pulse signal such as shown in FIG. 5(b) which is derived from the separated horizontal synchronizing signal from the synchronizing separation transistor 10 and delayed by the coil 27, the resistor 30 and the capacitors 28, 29 and subjected to the amplification and inversion at the transistor 31. Consequently, the transistor 16 for AGC voltage detector becomes conductive to charge the capacitor 36 only during the pedestal interval of the composite video signal in dependence upon the amplitude or level of the pedestal portion. The charged voltage is smoothed by a filter circuit of the resistor 37 and the capacitor 22 to be supplied to the high frequency amplifier 106 and the video-intermediate frequency amplifier 107. It is preferred to set the emitter bias voltage for the transistor 16 at a value corresponding to the middle level of the pulse amplitude of the pedestal portion by appropriately adjusting the resistors 18 and 19.

As will be understood from the foregoing description, according to the present invention, the pedestal portion of the composite video signal can be maintained constant without using the horizontal synchronizing pulse, namely even in the absence of the horizontal synchronization.

Furthermore, since the AGC circuit embodying the invention is operative so as to make the pedestal portion of the composite video signal to have a constant amplitude or level, image of a stabilized contract can be produced, insusceptible to the unevenness in the amplitude of the horizontal synchronizing signal. Besides, the black level can be stabilized without a special D.C. component regenerating circuit.

I claim:

1. An automatic gain control circuit for a television receiver comprising:
   an amplifier means for amplifying a television signal containing a composite video signal having a horizontal synchronizing signal and pedestal portions;
   a detector circuit for detecting the output signal from said amplifier means to produce said composite video signal;
   a horizontal synchronizing signal generator to separate and produce said horizontal synchronizing signal from said composite video signal;
   an automatic gain control signal generator for receiving said horizontal synchronizing signal and said composite video signal to produce an automatic gain control signal; and
   means for supplying said automatic gain control signal to said amplifier means to control the gain thereof so that the level of said pedestal portions can be maintained constant;
   wherein said automatic gain control signal generator comprises a switch circuit supplied with said horizontal synchronizing signal from said horizontal synchronizing signal generator and said composite video signal from said detector circuit for producing a modified composite video signal in which the pedestal portion thereof has a peak value and an automatic gain control signal detecting circuit supplied with said modified composite video signal from said switch circuit for producing said automatic gain control signal by peak rectification of said modified composite video signal; and said switch circuit is adapted to be turned off by said horizontal synchronizing signal during the duration thereof and turned on at least during the duration of said pedestal portion to thereby supply and composite video signal to said automatic gain control signal detecting circuit, whereby said automatic gain control signal detecting circuit produces an automatic gain control signal in dependence upon the level of said pedestal portion greater than a predetermined reference value.

2. An automatic gain control circuit for a television receiver comprising:
   an amplifier for amplifying a television signal containing a composite video signal having a horizontal synchronizing signal and pedestal portions;
   a detector coupled to an output of said amplifier for separating said composite video signal from said television signal;
   a horizontal synchronizing signal eliminator coupled to said detector for producing a modified composite video signal whose peak value is a level of said pedestal portions of said composite video signal and is obtained by eliminating said horizontal synchronizing signal from said composite video signal;
   an automatic gain control signal generator coupled to said eliminator for generating a control signal in accordance with said peak value of said modified composite video signal by peak rectification of said modified composite video signal; and means for supplying said control signal to said amplifier so that the gain of said amplifier is varied by said control signal to maintain said level of said pedestal portion constant.

3. An automatic gain control circuit as set forth in claim 2, wherein said eliminator comprises switching means coupled between said output of said amplifier and said generator, said switching means being adapted to be turned off during a duration of said synchronizing signal and turned on at least during a duration of said pedestal portions.

4. An automatic gain control circuit as set forth in claim 3, wherein said eliminator comprises a synchronizing signal separator coupled to said output of said amplifier for separating said synchronizing signal from said composite video signal and means for supplying said separated synchronizing signal to said switching means.

5. An automatic gain control circuit for a television receiver comprising:
an amplifier for amplifying a television signal containing a composite video signal which has a horizontal synchronizing signal and pedestal portions;
a detector for separating said composite video signal from said television signal;
a horizontal synchronizing signal eliminator coupled to said detector for producing from said composite video signal a modified composite video signal which substantially corresponds to said composite video signal with the horizontal synchronizing signal eliminated, the peak amplitude of said modified composite video signal being the level of said pedestal portions of said composite video signal.

6. An automatic gain control circuit comprising:
amplifier means for amplifying a television signal containing a composite video signal having a horizontal synchronizing signal and pedestal portions;
a detector circuit coupled to an output of said amplifier means for detecting said composite video signal from said television signal;
a horizontal synchronizing signal separator coupled to said detector circuit for separating said horizontal synchronizing signal from said composite video signal;
modifying means, supplied with said horizontal synchronizing signal and said composite video signal, for transforming said composite video signal into a modified composite video signals by combining said composite video signal with said horizontal synchronizing signal;
an automatic gain control signal generator, connected between said modifying means and said amplifier means, for peak rectifying said modified composite video signal to produce an automatic gain control signal supplied to said amplifier means for controlling the gain of said amplifier means in dependence upon the peak value of said modified composite video signal to maintain said peak value constant, wherein said modifying means produces said modified composite video signal having a peak amplitude equal to the level of said pedestal portions of said composite video signal from said detector circuit.

7. An automatic gain control circuit as set forth in claim 6, wherein said modifying means comprises an eliminator for eliminating said horizontal synchronizing signal from said composite video signal from said detector circuit.

8. An automatic gain control circuit as set forth in claim 7, wherein said eliminator comprises switching means coupled between said detector circuit and said automatic gain signal control generator, wherein said switching means is turned off during the duration of said synchronizing signal and turned on at least during the duration of said pedestal portions.

9. An automatic gain control circuit as set forth in claim 8, wherein said eliminator further comprises switch-controlling means for supplying said separated horizontal synchronizing signal to said switching means.

10. The automatic gain control circuit of claim 7, wherein said horizontal synchronizing signal eliminator comprises a switch circuit supplied with said horizontal synchronizing signal from said separator and said composite video signal from said detector, wherein said switch circuit is turned off by said horizontal synchronizing signal during the duration thereof and turned on during at least the duration of said pedestal portions of said composite video signal to thereby obtain the modified composite video signal supplied to said automatic gain control signal generator.

11. An automatic gain control circuit for a television receiver comprising:
an amplifier means for amplifying a television signal containing a composite video signal having a horizontal synchronizing signal and pedestal portions;
a detector circuit for detecting the output signal from said amplifier means to produce said composite video signal;
a horizontal synchronizing signal generator to separate and produce said horizontal synchronizing signal from said composite video signal;
an automatic gain control signal generator for receiving said horizontal synchronizing signal and said composite video signal to produce an automatic gain control signal; and
means for supplying said automatic gain control signal to said amplifier means to control the gain thereof so that the level of said pedestal portions are maintained constant;
wherein said automatic gain control signal generator comprises a switch circuit supplied with said horizontal synchronizing signal from said horizontal synchronizing signal generator and said composite video signal from said detector circuit for producing a signal in which the pedestal portions thereof have a peak value to thereby produce an automatic gain control signal in accordance with the peak value of said signal, and an automatic gain control signal detecting circuit for receiving the output signal from said switch circuit to produce said automatic gain control signal; and
wherein said switch circuit is turned off by said horizontal synchronizing signal during the duration thereof and turned on at least during the duration of said pedestal portion to thereby supply said composite video signal to said automatic gain control signal detecting circuit, said automatic gain control signal detecting circuit producing an automatic gain control signal in dependence upon the level of said pedestal portion when the level of said pedestal portion is greater than a predetermined reference value.

* * * * *